United States Patent [19]

Nishigaki et al.

[11] Patent Number: 5,041,152

[45] Date of Patent: Aug. 20, 1991

[54] APPARATUS FOR BENDING TUBULAR GLASS

[75] Inventors: Noriaki Nishigaki, Yokosuka; Hisao Hosoya, Yokohama; Kazuyuki Tanaka, Hyogo; Youichi Iwasaki; Morio Tominaga, both of Yokohama, all of Japan

[73] Assignee: Kabushiki Kaisha Toshiba, Kawasaka, Japan

[21] Appl. No.: 172,547

[22] Filed: Mar. 24, 1988

[30] Foreign Application Priority Data

Mar. 26, 1987 [JP] Japan ............................. 62-72108
Jan. 5, 1988 [JP] Japan ............................. 63-479

[51] Int. Cl.⁵ .............................................. C03B 23/06
[52] U.S. Cl. ............................... 65/163; 65/108; 65/281; 65/292
[58] Field of Search ............ 65/108, 109, 163, 281, 65/292, 158

[56] References Cited

U.S. PATENT DOCUMENTS 2,494,872 1/1950 Greiner et al. ................. 65/281
3,215,518 11/1965 Reijnders ........................ 65/281
3,910,662 10/1975 Fujio et al. ..................... 65/281
3,920,434 11/1975 Ishisaka ......................... 65/281

FOREIGN PATENT DOCUMENTS 45-39632 12/1970 Japan ............................. 65/281
55-100228 1/1979 Japan .
60-177529 9/1985 Japan .

*Primary Examiner*—Joye L. Woodard
*Attorney, Agent, or Firm*—Cushman, Darby & Cushman

[57] ABSTRACT

A glass tube bending apparatus according to the present invention includes a drum for bending a heated/softened glass tube into a circular shape, a first driving device, coupled to the drum, for moving the drum straight, and a second driving device, coupled to the drum, for rotating the drum in a direction, and a control for independently controlling the rotating speed and the moving speed of the drum. According to this apparatus, the operation speeds of rotating and moving of the drum can be controlled independently. Therefore, distortion of glass tubes can be decreased, and thermal bending of tubes can be performed with high precision. Further, various sorts of glass tubes can be treated. Still further, since the first driving device and the second driving device are operated in synchronism, the precision of the thermal bending of glass tubes is enhanced.

14 Claims, 5 Drawing Sheets

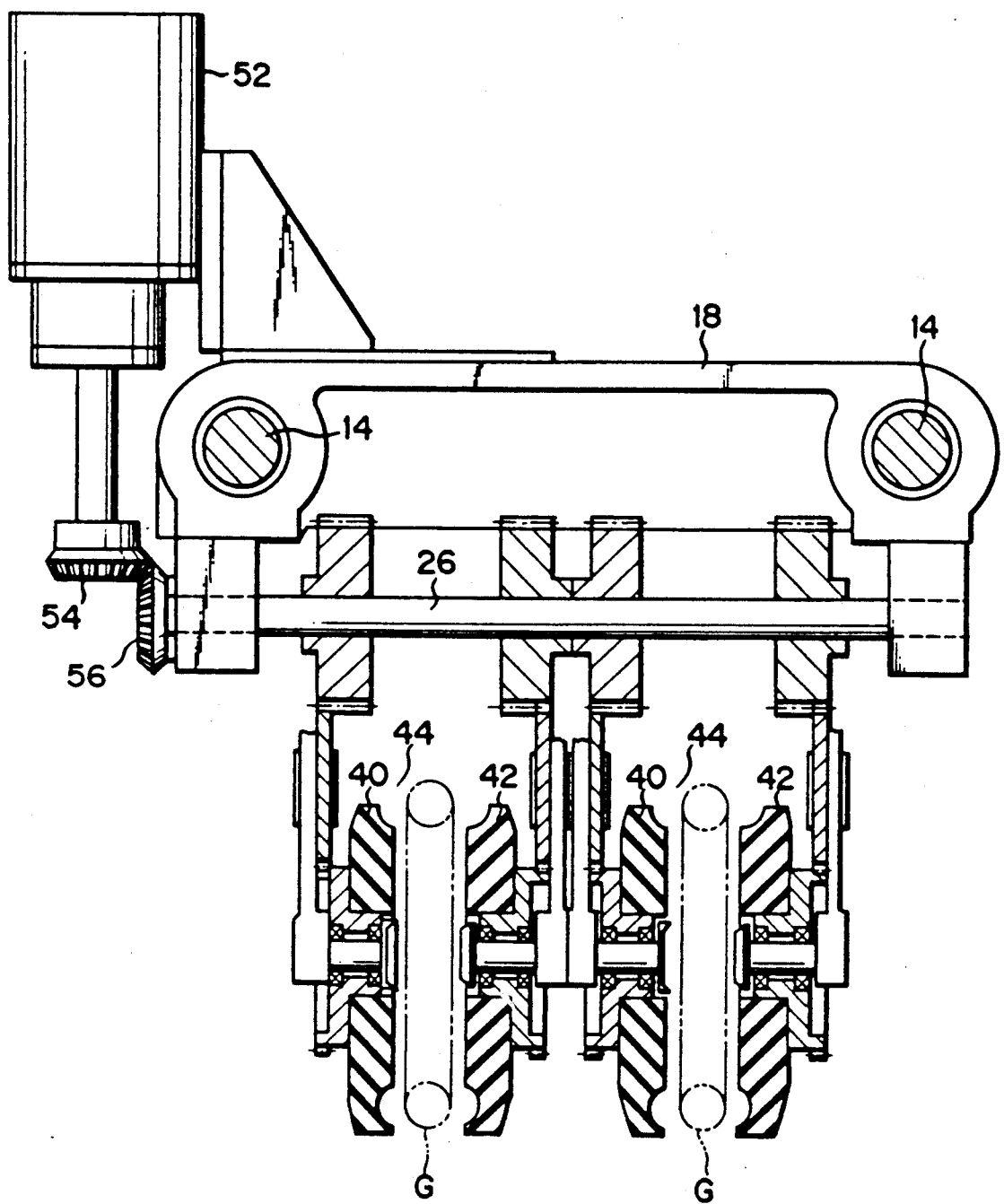
F I G. 2

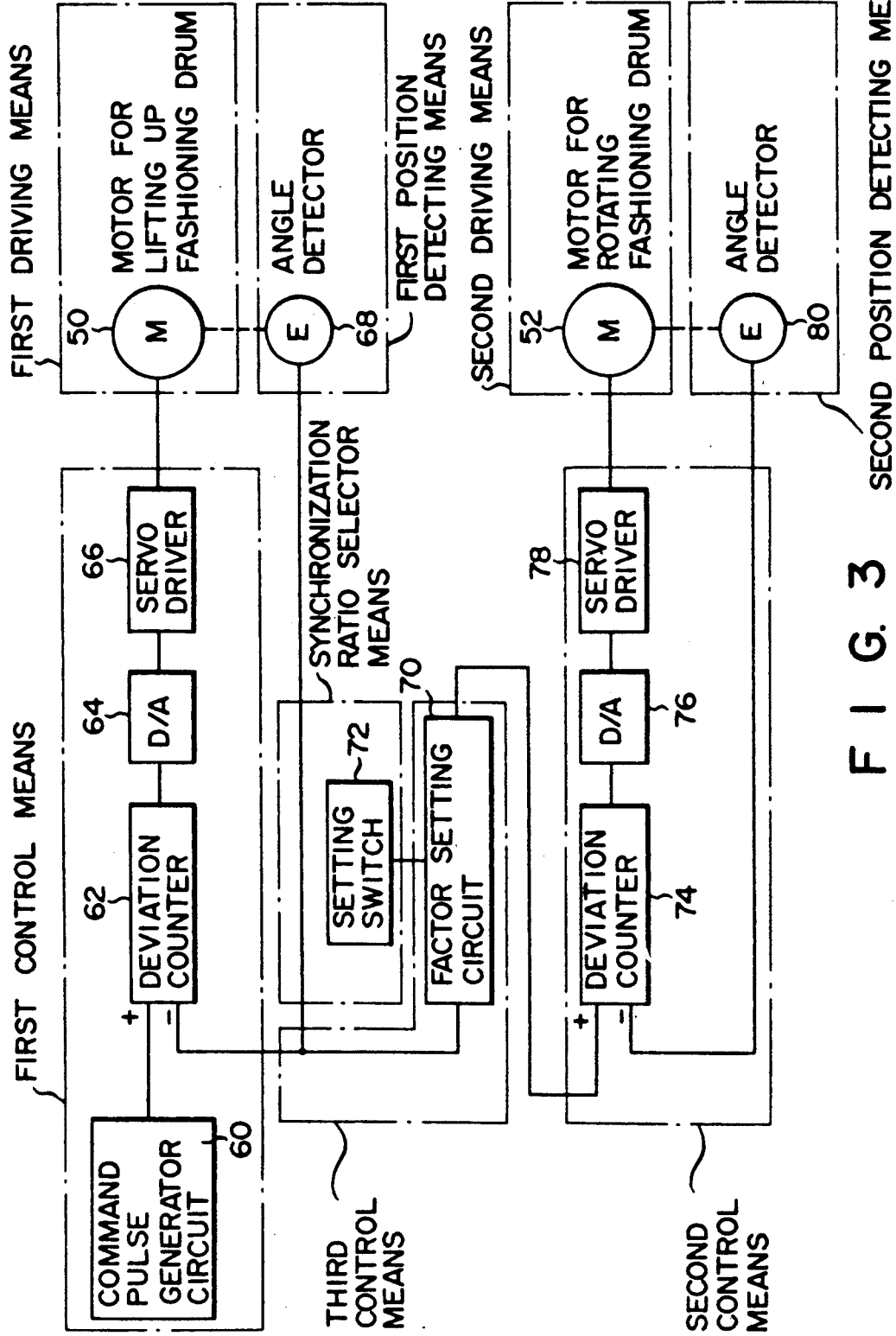
F I G. 3

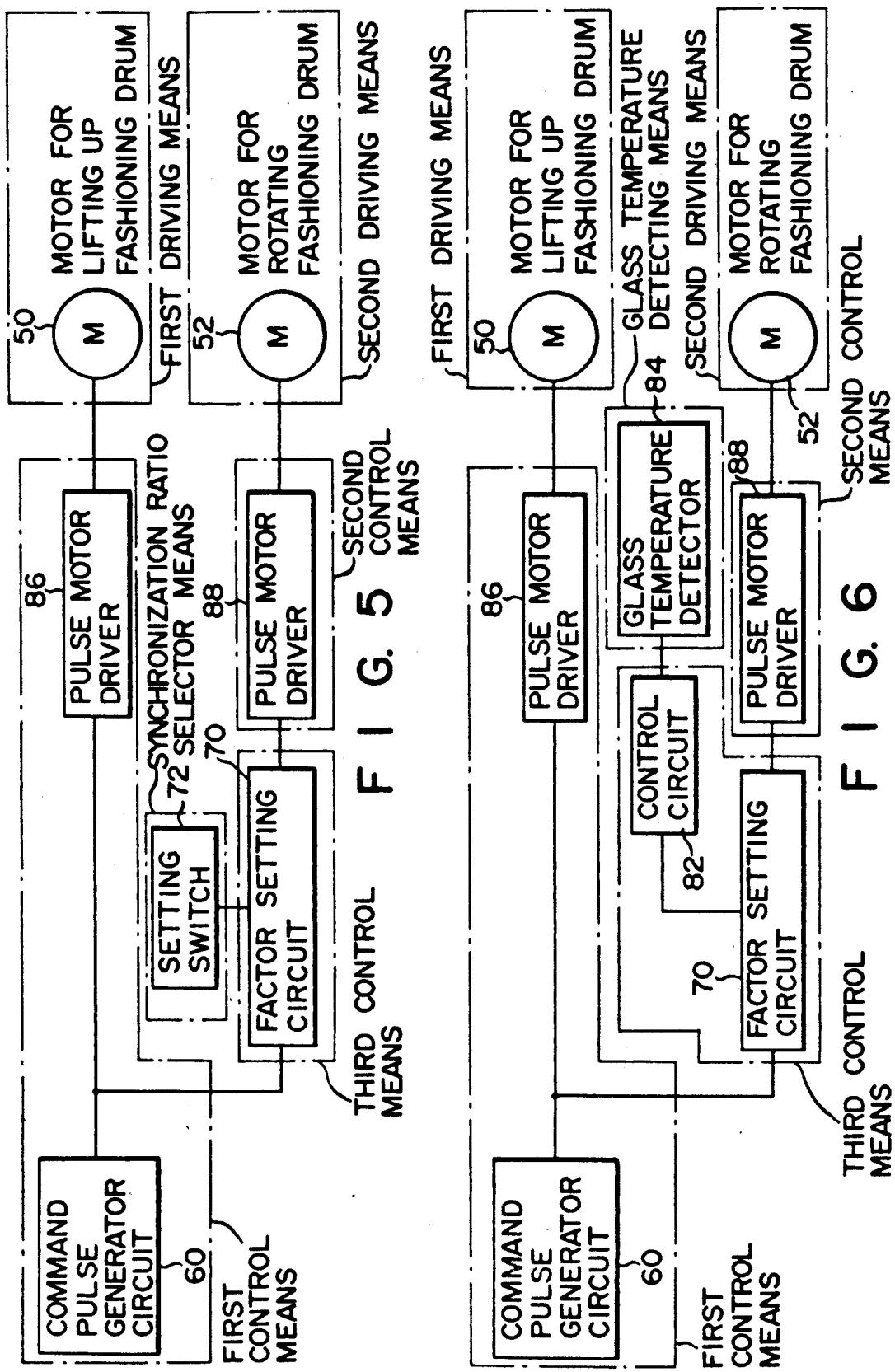

APPARATUS FOR BENDING TUBULAR GLASS

BACKGROUND OF THE INVENTION

1. Field of the Invention

A glass tube of an annular fluorescent lamp is manufactured in such a manner that a straight glass tube is heated/softened in advance, and this glass tube (to be referred to as a tube hereinafter) is wound around a forming groove formed in an outer surface of a bending drum (to be referred to as a drum herein after), thereby bending the tube into an annular shape.

2. Description of the Related Art

A technique disclosed in Japanese Patent Disclosure (Kokai) No. 60-177529 is known as a prior art of such techniques. This technique is characterized in that in a method wherein a lower end portion of a heated/softened straight tube is locked by a drum, and the drum is lifted while the drum winds up the tube to form the tube into an annular shape, a variable-speed motor for driving the drum is controlled by an operation controller, thereby setting the ascending speed of the drum at optimal speeds with respect to various types of tubes. According to such a method, bending of various types of tubes having different thicknesses, sizes, and qualities can be performed by simple resetting of speeds using a single apparatus. Therefore, manufacturing efficiency and yield can be increased.

However, in the above tubular glass tube bending apparatus, the two speeds of the drum, i.e., the rotational and ascending speeds are determined by one driving system (in this case, one motor). More specifically, the rotation of the motor serving as the driving system is transferred by a chain or the like so as to lift the drum, and the rotation simultaneously causes the drum to be rotated through a gear mechanism or the like. For this reason, although only one driving unit is required in this arrangement, the relationship (gear ratio) between the rotational and ascending speeds of the drum is fixed. Thus, throughout the process of winding glass tubes, the ratio between the rotational and ascending speeds of the drum is constant, that is, when the ascending speed of the drum increases, the rotational speed of the same also increases, and when the former decreases, the latter also decreases. As a result, a disadvantage arises in that some sorts of glass tubes are distorted at the start of the winding process and therefore cracked easily. Also, glass tubes cannot be bent with precision.

Further, when glass tubes having different sizes are to be bent by a single apparatus, bending drums must be changed because glass diameters or annular radii are different from each other. If the diameter of the drum is increased, the rotational speed with respect to the ascending speed of the tube is excessively increased, and hence processing cannot be smoothly performed.

SUMMARY OF THE INVENTION

It is an object of the present invention to provide a tubular glass bending apparatus which can independently control the speeds of linear movement and rotation of bending drum.

To achieve the object, the tubular glass bending apparatus of the invention comprises: drum means for bending a softened glass tube into a circular shape; first driving means, coupled to the drum means, for moving the drum means in a straight direction; second driving means, coupled to the drum means, for rotating the drum means; and control means for controlling the first and second driving means.

According to the present invention, even when the bending drum is replaced with another drum so as to bend glass tubes having various sizes using a single apparatus, excellent bending can be performed because the peripheral velocity can be controlled.

In general, to bend glass tubes excellently, the rotational speed of the drum should preferably be fast relative to the ascending speed of the same at the start of the winding process, and the rotating and ascending speeds should preferably be the same at the middle stage and end of the winding process. According to the present invention, the first and second driving means can be controlled independently and it is possible to electrically synchronize between the rotating speed and the ascending speed. Therefore, glass tubes can be bent desirably.

In addition, a more desirable control system can be obtained by arranging a control means for controlling the first and second driving means to be synchronized with each other in accordance with a set factor.

By utilizing such a method, the ratio of movement in the linear direction to rotation of the bending drum can be arbitrarily set, thereby realizing synchronization of the movements of the two driving means. It is therefore possible to set the synchronization ratio between the rotation and lifting of the drum to any desired value for the start, middle, and end of the winding process, whereby glass tubes can be bended excellently.

Further, even when a bending drum is replaced with another so as to perform bending of glass tubes of various sizes using a single apparatus, excellent bending can be performed because the peripheral velocity can be controlled. In addition, since the ratio of synchronization can be easily changed, the relationship between the amount of movement in the linear direction and the rotational angle can be adjusted. Therefore, variation in softness of heated glass tubes can be compensated for by adjusting the synchronization ratio, and further excellent bending can be performed.

BRIEF DESCRIPTION OF THE DRAWINGS

Other objects and advantages will be apparent from the following description taken in conjunction with the accompanying drawings in which:

FIG. 2 is a sectional view taken along line II—II in FIG. 1;

FIG. 3 is a block diagram of the tubular glass bending apparatus according to the present invention;

FIG. 5 is a block diagram of a tubular glass bending apparatus according to still another embodiment of the present invention; and FIG. 6 is a block diagram of a tubular glass bending apparatus according to still another embodiment of the present invention.

DETAILED DESCRIPTION OF THE PREFERRED EMBODIMENTS

Figure 1:
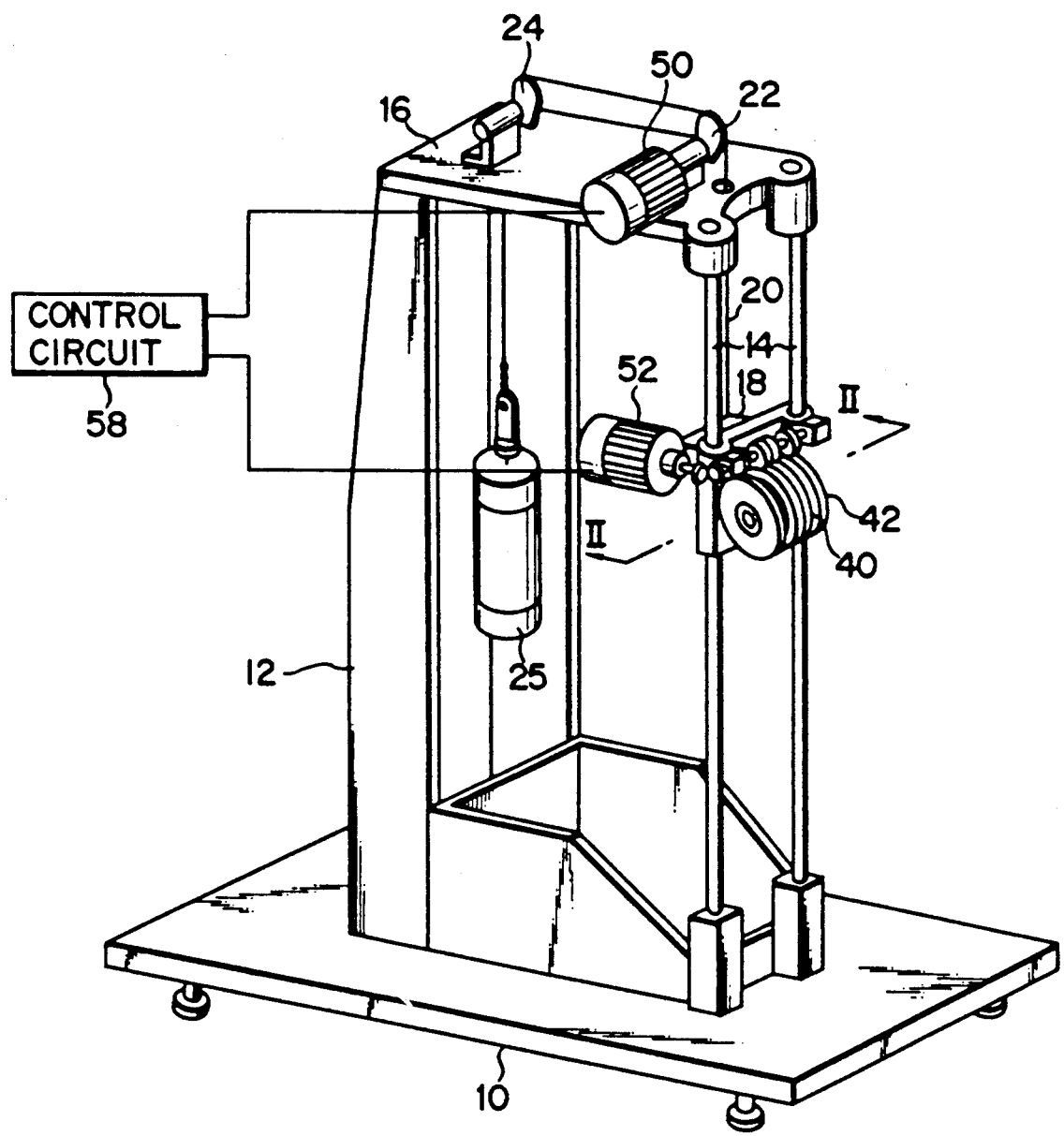
FIG. 1 is a perspective view showing an arrangement of a tubular glass bending apparatus including an external power source circuit according to the present invention.

An embodiment of the present invention will be described below with reference to FIGS. 1 to 3.

In FIG. 3, motor 50 for lifting the bending drum constitutes first driving means, and motor 52 for rotating the drum constitutes second driving means. Command pulse generator circuit 60, deviation counter 62 for drum-lifting motor 50, D/A converter 64 and servo driver 66 constitute first control means, whereas deviation counter 74 for drum-rotating motor 52, D/A converter 76 and servo driver 78 constitute second control means. Third control means includes factor setting circuit 70. First position detecting means includes detector 68 for detecting the rotational angle of drum-lifting motor 50, and second position detecting means includes detector 80 for detecting the rotational angle of drum-rotating motor 52. Ratio setting switch 72 constitutes synchronization ratio selector means.

Reference numeral 10 denotes a table, to which deck 16 is fixed through frame 12 and guide columns 14.

Elevating base 18 mounted on guide columns 14 to be vertically moved is suspended through chain 20. Chain 20 is wound around sprocket 22 driven by bending drum lifting motor 50 which is mounted on an upper surface of deck 16, and is coupled to balance weight 25 through another sprocket 24.

Accordingly, elevating base 18 is vertically moved upon rotation of motor 50 for lifting up bending drums. Bending drum lifting motor 50 is a variable-speed motor such as a servo motor or a stepping motor. The speed of motor 50 is changed in accordance with a signal supplied from control circuit 58, and therefore, the ascending/descending speed of elevation base 18 can be changed.

Motor 52 for rotating bending drums is mounted on elevating base 18. Bending drum rotating motor 52 is coupled to driving shaft 26 through bevel gears 54 and 56.

Motor 52 is also a variable-speed motor such as a servo motor or a stepping motor. The speed of motor 52 is changed in accordance with a signal supplied from control circuit 58, and therefore, the rotational speeds of bending drums 40 and 42 can be changed.

According to such an arrangement, bending drum lifting motor 50 and bending drum rotating motor 52 have different functions, and their rotational speeds can be independently controlled. Therefore, the ascending speed or linear moving speed, and rotational speed of bending drums 40 and 42 can be arbitrarily selected.

In general, to bend glass tubes G excellently, the rotational speed of the drum should preferably be fast relative to the ascending speed of the same at the start of the winding process, and the rotating and ascending speeds should preferably be the same at the middle stage and end of the winding process. According to the present invention, the first and second driving means can be controlled independently, and it is possible to electrically synchronize between the rotating speed and the ascending speed. Therefore, glass tubes G can be bent desirably.

With this arrangement, the softened glass tube G is wound around forming grooves 44 formed in outer surfaces of bending drums 40 and 42, and is bent and formed into an annular shape having a radius corresponding to the radius of forming grooves 44.

Upon completion of such a bending process, the glass tube G is cooled/hardened within a given period of time. After the glass tube G is sufficiently cooled/hardened, the resultant annular glass tube G can be taken out by separating bending drums 40 and 42 from each other using a driving unit (not shown) such as a cylinder.

FIG. 3 is a block diagram showing control circuit 58 in detail. Control circuit 58 comprises command pulse generator circuit 60 for generating a command pulse for causing bending drum lifting motor 50 to perform a predetermined operation, deviation counter 62, D/A converter 64, servo driver 66, bending drum lifting motor 50, elevated position detection means such as angle detector 68, factor setting circuit 70, setting switch 72 which operates as a change means to allow an input synchronization ratio to be changed, bending drum rotating motor 52, deviation counter 74 for motor 52, D/A converter 76, servo driver 78, and angle detector 80 for motor 52. Motors 50 and 52 in this embodiment are AC or DC motors.

Command pulses from command pulse generator circuit 60 are supplied to the + terminal of deviation counter 62, and the number of pulses are counted. A voltage proportional to the number of accumulated pulses in deviation counter 62 is output from D/A converter 64 and amplified by servo driver 66. Then, bending drum lifting motor 50 is rotated in accordance with the amplified voltage. The rotational angle is detected by angle detector 68 as an indication of the elevated location of the bending drum. The detection result in the form of an elevated position signal, is fed back to the − terminal of deviation counter 62 as a pulse, and number of the accumulated pulses in deviation counter 62 is decremented. The detection result is also supplied to factor setting circuit 70. The frequency of the pulse from angle detector 68 is divided on the basis of the ratio set by setting switch 72. A pulse obtained upon division of the frequency is supplied to the + terminal of deviation counter 74 for motor 52. An output from deviation counter 74 is supplied to D/A converter 76. Then, a voltage proportional to the number of accumulated pulses in deviation counter 74 is output from D/A converter 76. The output voltage is amplified by servo driver 78. Bending drum rotating motor 52 is rotated in accordance with the amplified voltage. The rotational angle of motor 52 is detected by angle detector 80. The detection result is supplied to the − terminal of deviation counter 74 as a pulse.

The rotational angles of bending drum lifting motor 50 and bending drum rotating motor 52 are synchronized with each other at a predetermined ratio by control circuit 58 with such an arrangement.

According to the present invention, the linear movement speed of the bending drum in a given direction and the rotational speed thereof can be controlled so as to be synchronized with each other at a predetermined ratio. Therefore, even if variation in softness of glass tubes due to variation in heating is caused or variation in extension upon winding is caused, the thicknesses of glass tubes can be made substantially uniform by controlling the linear movement speed or the rotational speed, thereby excellent bending can be performed. In addition, even when the bending drum is replaced with another so as to perform bending of glass tubes having different sizes using a single apparatus, excellent bending can be performed because the peripheral velocity can be controlled.

In addition, since the ratio of synchronization can be easily changed, the relationship between the amount of linear movement and the rotational angle can be adjusted. Therefore, even if variation in softness of heated glass tubes is caused, excellent bending can be performed by adjusting the synchronization ratio.

Figure 4:
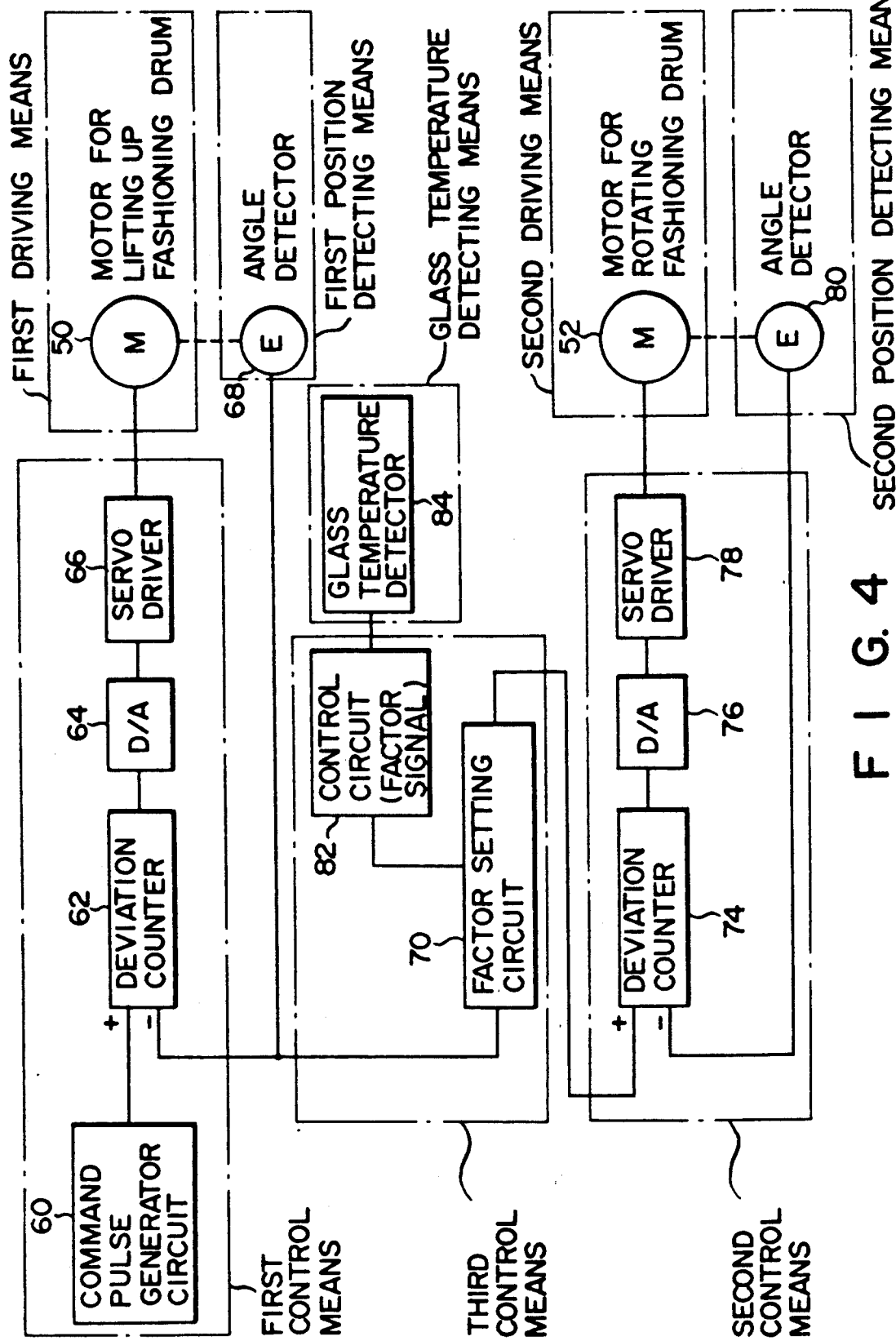
FIG. 4 is a block diagram of a tubular glass bending apparatus according to another embodiment of the present invention.

Another embodiment of control circuit 58 used in the present invention will be described with reference to FIG. 4. In this embodiment, the factor is variably set by factor setting circuit 70 on the basis of glass temperature information during bending of a glass tube. More specifically, a factor signal is formed by control circuit 82 constituted by, e.g., a sequencer or a microprocessor in accordance with an output signal from glass temperature detector 84. A pulse output from angle detector 68 is frequency-divided on the basis of this factor signal, thereby driving bending drum rotating motor 52. Other arrangements are the same as those in FIG. 3. The same reference numerals in FIG. 4 denote the same parts as in FIG. 3, and a detailed description thereof will be omitted.

According to this embodiment, control circuit 82 supplies a signal for setting an optimal synchronization ratio with respect to the glass temperature to factor setting circuit 70. In an annular glass tube bending apparatus of the type in the present invention, a glass tube is normally heated up to 700 to 770° C and cooled by blowing air immediately after the tube is wound around the bending drum in an annular shape. If the temperatures of glass tubes are constant, no problem is posed. However, if the temperature of a glass tube is excessively increased, it cannot be cooled upon blowing of air. As a result, when the bending drums are separated from each other, the winding angle of the glass tube is increased. In such a case, by employing control circuit 50 according to the present invention, a defective lamp can be prevented even when the temperature varies by adjusting the synchronization ratio and winding the glass tube at an angle larger than a normal angle. Thus, since a glass tube can be wound around the bend drum at an optimal synchronization ratio, by setting the rotating speed faster than the ascending speed when the glass temperature is higher than normal condition, a reliable bending apparatus can be realized.

In addition, an annular glass tube bending apparatus of the type in the present invention is normally a rotary type apparatus having a large number of heads. A straight glass tube is mounted on each head and is formed into an annular shape. In this case, when a straight glass tube is not mounted on a given head, since an amount of heat given to one glass tube increases, the temperature of the next glass becomes higher than a normal temperature. Similar to the previous embodiment, in this case, the glass tube is wound at an angle larger than a normal angle by adjusting the synchronization ratio, thereby realizing a reliable bending apparatus.

Still another embodiment of control circuit 58 used in the present invention will be described with reference to FIG. 6. In the embodiment shown in FIG. 6, pulse motor driver 86 drives motor 50 for lifting up the fashioning drum and pulse motor driver 88 drives motor 52 for rotating the fashioning drum. The temperature signal from glass temperature detecting means 84 for detecting the temperature of the glass tube G is fed into control circuit 82 and a signal therefrom is supplied to factor setting circuit 70, thereby controlling a ratio of the operations of pulse motor drivers 86 and 88.

According to the embodiment shown in FIG. 6, the glass tube G can be elaborately processed by changing the operations of pulse motor drivers 86 and 88 in accordance with the temperature of the glass detected by temperature detecting means.

Furthermore, an electronic control unit including a CPU, software for executing the necessary control operations, etc. can be used as the above-mentioned controller. In this case, a signal from the glass temperature detector or from the detector for the driving means is read, and a corresponding signal processed by a first control means 60, 62, a second control means 74 and third control means 70 which are constructed by the software program, thereby controlling the driving means, etc. by the processed signal.

Note that the present invention is not limited to the above-described embodiments.

For example, although the above embodiments are described with reference to the case wherein the bend drums are vertically moved, the bend drums may be horizontally moved to perform bending of a glass tube.

In addition, although in the above embodiments, motor 52 for rotating bend drums is synchronized with the operation of motor 50 for lifting up bend drums, they may be synchronized with each other in the opposite manner.

What is claimed is:

1. An apparatus for bending a straight tube to form a circular tube comprising:

drum means for bending a softened straight glass tube into a circular shape including means for supporting said drum means to be movable in a linear direction and to be rotatable;

a first driving means, coupled to said drum means, for moving said drum means in a linear direction;

a second driving means, coupled to said drum means, for rotating said drum means;

a control means coupled to said first and second driving means for independently controlling a rotating speed and a linear moving speed of said drum means; and detecting means for detecting a position of said drum means, generating a position signal, and feeding said position signal to said control means.

2. An apparatus according to claim 1, further comprising temperature detecting means for detecting a temperature of a softened glass tube being bent by said drum means, generating a temperature signal, and feeding said temperature signal to said control means to synchronize said rotating speed and said linear moving speed of said drum means.

3. An apparatus according to claim 2, further comprising change means for inputting a synchronizing ratio, and for changing a synchronizing rate ratio between said rotating speed and said linear moving speed of said drum means in accordance with said input synchronizing ratio.

4. An apparatus according to claim 1, further comprising change means for inputting a synchronizing ratio, and for changing a ratio between said rotating speed and said linear moving speed of said drum means in accordance with said input synchronizing ratio.

5. An apparatus for bending a straight tube to form a circular tube comprising:

drum means for bending a softened straight glass tube into a circular shape including means for supporting said drum means to be movable in a linear direction and to be rotatable;

a first driving means, coupled to said drum means, for moving said drum means in a linear direction;

a second driving means, coupled to said drum means, for rotating said drum means;

a control means coupled to said first and second driving means for independently controlling a rotating speed and a linear moving speed of said drum means, wherein said control means includes:
a first control means, connected to said first driving means, for controlling said first driving means;
a second control means, connected to said second driving means, for controlling said second driving means;
synchronizing means for synchronizing said linear moving speed of said drum means controlled by said first control means with said rotating speed of said drum means controlled by said second control means, further comprising detecting means which includes:
a first detection means for detecting an elevated location of said drum means, and generating an elevated position signal indicative thereof, and feeding said elevated location signal to said first control means; and
a second detection means for detecting a rotational position of said drum means, generating a rotational position signal, and feeding said rotational position signal to said second control means.

6. An apparatus according to claim 5, further comprising temperature detecting means for detecting a temperature of a softened glass tube being bent by said drum means, generating a temperature signal, and feeding said temperature signal to said synchronizing means to synchronize said rotating speed and said linear moving speed of said drum means.

7. An apparatus according to claim 6, further comprising change means for inputting a synchronizing ratio and for changing a ratio between the rotating speed and the linear moving speed of said drum means in accordance with said input synchronizing ratio.

8. An apparatus according to claim 5, further comprising change means for inputting a synchronizing ratio and for changing a ratio between said rotating speed and said linear moving speed of said drum means in accordance with said input synchronizing ratio.

9. An apparatus for bending a straight tube to form a circular tube comprising:
drum means for bending a softened straight glass tube into a circular shape including means for supporting said drum means to be movable in a linear direction and to be rotatable;
a first driving means, coupled to said drum means, for moving said drum means in a linear direction;
a second driving means, coupled to said drum means, for rotating said drum means;
a control means coupled to said first and second driving means for independently controlling a rotating speed and a linear moving speed of said drum means; and
temperature detecting means for detecting a temperature of a softened glass tube being bend by said drum means, generating a temperature signal, and feeding said temperature signal to said control means.

10. An apparatus according to claim 9, further comprising change means for inputting a synchronizing ratio, and for changing a ratio between said rotating speed and said linear moving speed of said drum means in accordance with said input synchronizing ratio.

11. An apparatus for bending a straight tube to form a circular tube comprising:

drum means for bending a softened straight glass tube into a circular shape including means for supporting said drum means to be movable in a linear direction and to be rotatable;
a first driving means, coupled to said drum means, for moving said drum means in a linear direction;
a second driving means, coupled to said drum means, for rotating said drum means; and
a control means coupled to said first and second driving means for independently controlling a rotating speed and a linear moving speed of said drum means, wherein said control means includes:
a first control means, connected to said first driving means, for controlling said first driving means;
a second control means, connected to said second driving means, for controlling said second driving means;
synchronizing means for synchronizing said linear moving speed of said drum means controlled by said first control means with said rotating speed of said drum means controlled by said second control means, further comprising temperature detecting means for detecting a temperature of a softened glass tube being bent by said drum means, generating a temperature signal, and feeding said temperature signal to said synchronizing means to synchronize said rotating speed and said linear moving speed of said drum means.

12. An apparatus according to claim 11, further comprising change means for inputting a synchronizing ratio and for changing a ratio between said rotating speed and said linear moving speed of said drum means in accordance with said input synchronizing ratio.

13. An apparatus for bending a straight tube to form a circular tube comprising:
a drum means for bending a softened straight glass tube into a circular shape including means for supporting said drum means to be movable in a linear direction and to be rotatable;
a first driving means, coupled to said drum means, for moving said drum means in a linear direction;
a second driving means, coupled to said drum means, for rotating said drum means;
a control means coupled to said first and second driving means for independently controlling a rotating speed and a linear moving speed of said drum means; and
change means for inputting a synchronizing ratio, and for changing a ratio between said rotating speed and said linear moving speed of drum means in accordance with said input synchronizing ratio.

14. An apparatus for bending a straight tube to form a circular tube comprising:
drum means for bending a softened straight glass tube into a circular shape including means for supporting said drum means to be movable in a linear direction and to be rotatable;
a first driving means, coupled to said drum means, for moving said drum means in a linear direction;
a second driving means, coupled to said drum means, for rotating said drum means; and
a control means coupled to said first and second driving means for independently controlling a rotating speed and a linear moving speed of said drum means, wherein said control means includes:

a first control means, connected to said first driving means, for controlling said first driving means;
a second control means, connected to said second driving means, for controlling said second driving means;
synchronizing means for synchronizing said linear moving speed of said drum means controlled by said first control means with said rotating speed of said drum means controlled by said second control means,
further comprising change means for inputting a synchronizing ratio and for changing a ratio between said rotating speed and said linear moving speed of said drum means in accordance with said input synchronizing ratio.

* * * * *